US007416809B2

(12) United States Patent
Narayanan et al.

(10) Patent No.: US 7,416,809 B2
(45) Date of Patent: Aug. 26, 2008

(54) CATALYST MATERIALS FOR FUEL CELLS

(75) Inventors: Sekharipuram R. Narayanan, Altadena, CA (US); Subbarao Surampudi, Glendora, CA (US)

(73) Assignee: California Institute of Technology, Pasadena, CA (US)

( * ) Notice: Subject to any disclaimer, the term of this patent is extended or adjusted under 35 U.S.C. 154(b) by 57 days.

(21) Appl. No.: 11/446,009

(22) Filed: Jun. 1, 2006

(65) Prior Publication Data

US 2006/0216576 A1 Sep. 28, 2006

Related U.S. Application Data

(60) Division of application No. 10/034,094, filed on Dec. 27, 2001, now abandoned, which is a continuation of application No. 09/305,249, filed on May 4, 1999, now Pat. No. 6,391,486, which is a continuation of application No. 08/827,319, filed on Mar. 26, 1997, now Pat. No. 5,945,231.

(60) Provisional application No. 60/014,166, filed on Mar. 26, 1996.

(51) Int. Cl.
*H01M 4/00* (2006.01)
(52) U.S. Cl. .............................. 429/40; 429/42; 429/44; 502/60; 502/64; 502/66; 502/100
(58) Field of Classification Search .................. 429/40, 429/42, 44; 502/60, 66, 64, 100
See application file for complete search history.

(56) References Cited

U.S. PATENT DOCUMENTS

| 3,097,116 A | * | 7/1963 | Moos | .......................... | 429/42 |
| 5,773,162 A | * | 6/1998 | Surampudi et al. | ............ | 429/42 |

* cited by examiner

*Primary Examiner*—Laura S Weiner
(74) *Attorney, Agent, or Firm*—Law Office SC Harris

(57) ABSTRACT

An improved direct liquid-feed fuel cell having a solid membrane electrolyte for electrochemical reactions of an organic fuel. Improvements in interfacing of the catalyst layer and the membrane and activating catalyst materials are disclosed.

3 Claims, 4 Drawing Sheets

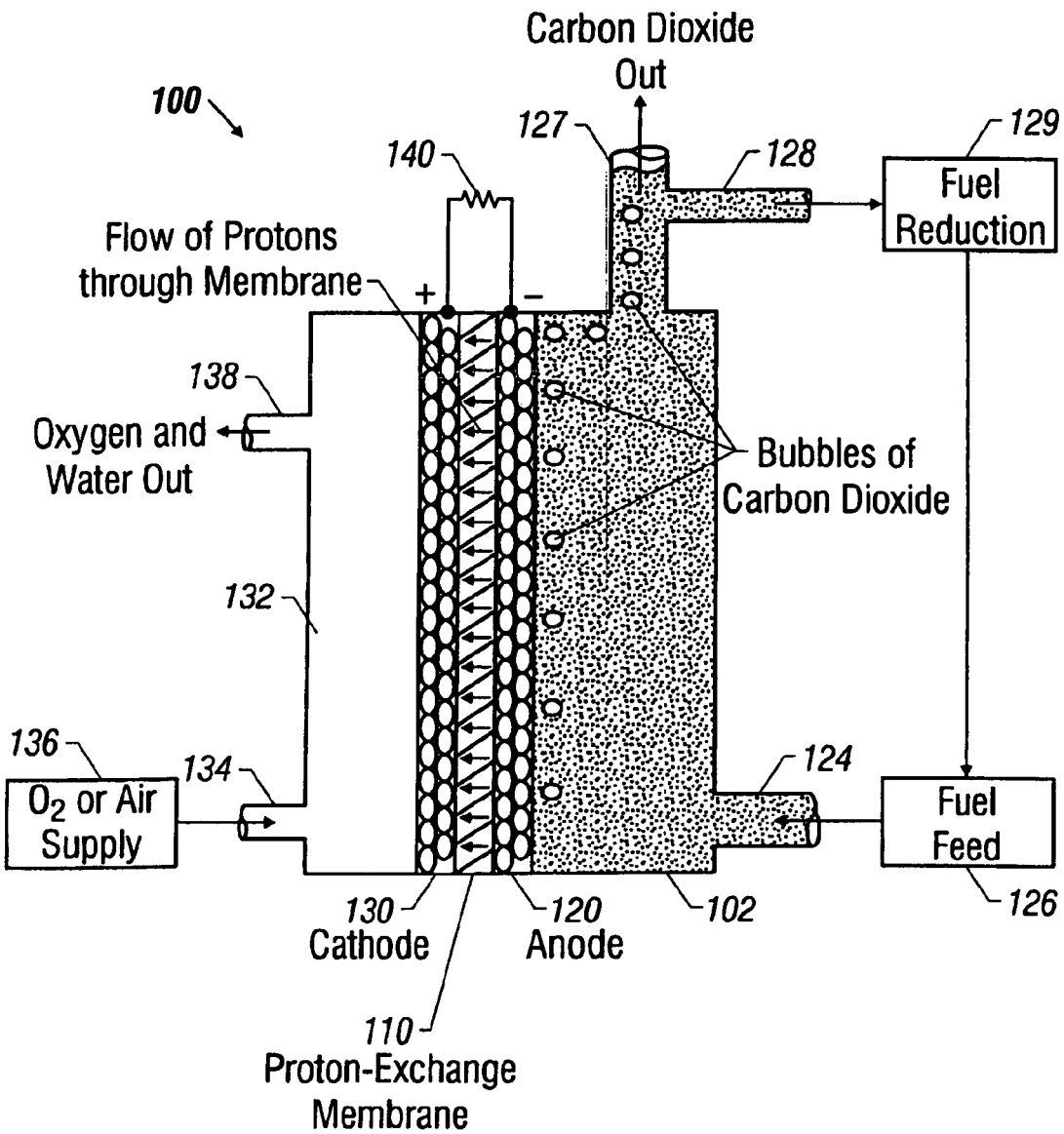
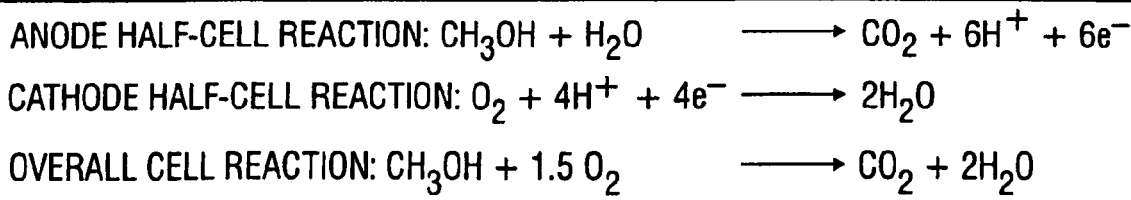
FIG. 1

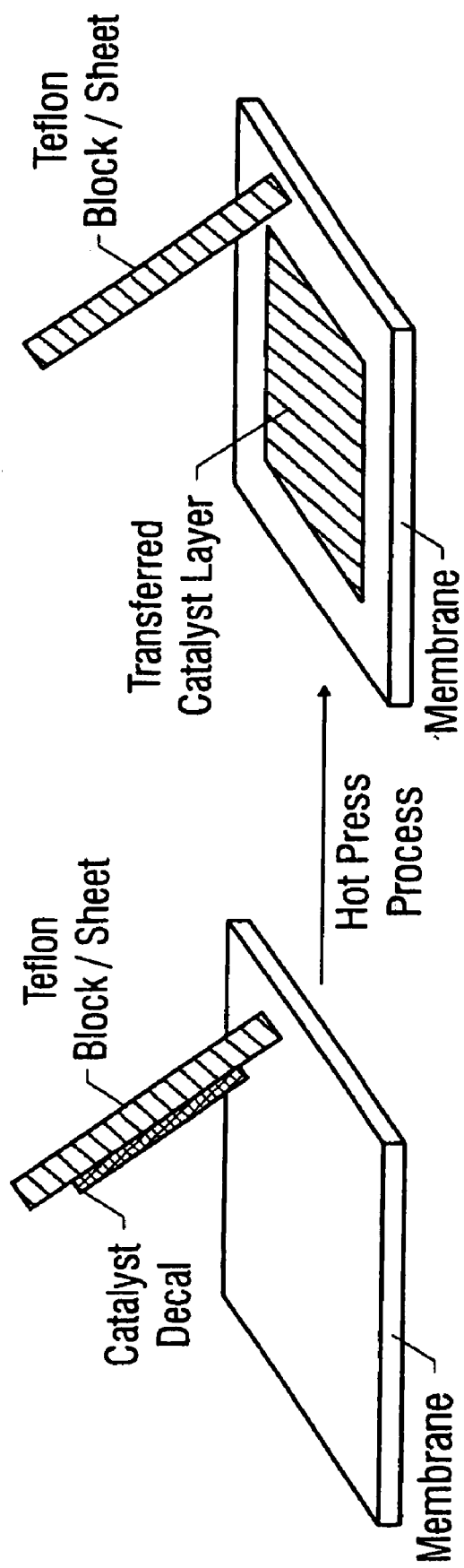

CATALYST MATERIALS FOR FUEL CELLS

This application is a divisional of U.S. patent application Ser. No. 10/034,094 filed Dec. 27, 2001, now abandoned which is a continuation of U.S. patent application Ser. No. 09/305,249 filed May 4, 1999, now U.S. Pat. No. 6,391,486 which is a continuation of U.S. patent application Ser. No. 08/827,319 filed Mar. 26, 1997 (now U.S. Pat. No. 5,945,231, issued Aug. 31, 1999). U.S. patent application Ser. No. 08/827,319 claims the benefit of U.S. Provisional Application No. 60/014,166 filed on Mar. 26, 1996. The disclosures of the prior applications are incorporated herewith in their entirety by reference.

ORIGIN OF THE INVENTION

The invention described herein was made in the performance of work under a NASA contract and is subject to the provisions of Public Law 96-517 (35 U.S.C. 202) in which the Contractor has elected to retain title.

FIELD OF THE INVENTION

The present invention relates to fuel cells for generating energy by electrochemical reactions, and more specifically to a direct-feed oxidation fuel cell and manufacturing thereof.

BACKGROUND AND SUMMARY OF THE INVENTION

Organic fuels can be used to generate electrical power by converting energy released from electrochemical reactions of the fuels. Organic fuels, such as methanol, are renewable. Typical products from the electrochemical reactions are mostly carbon dioxide and water. These products are environmentally safe. Therefore, organic fuel cells are considered as an alternative energy source to non-renewable fossil fuels for many applications. In addition, use of fuel cells can eliminate many adverse environmental consequences associated with burning of fossil fuels, for example, air pollution caused by exhaust from gasoline-powered internal combustion engines.

Direct liquid-feed oxidation fuel cells are of particular interest due to a number of advantages over other fuel cell configurations. For example, the organic fuel is directly fed in to the fuel cell. This eliminates the necessity of having a chemical pre-processing stage. Also, bulky accessories for vaporization and humidification in gas-feed fuel cells are eliminated. Thus, direct liquid-feed cells generally have simple cell construction and are suitable for many applications requiring portable power supply.

Conventional direct liquid-feed cells usually use a liquid mixture of an organic fuel and an acid/alkali electrolyte liquid, which is circulated past the anode of the fuel cell. Problems associated with such a conventional direct liquid-feed cell are well recognized in the art. For example, corrosion of cell components caused by the acid/alkali electrolyte places significant constraints on the materials that can be used for the cell; fuel catalysts often exhibit poor activity due to adsorption of anions created by the acid electrolyte; and the use of sulfuric acid electrolyte in multi-cell stacks can result in parasitic shunt currents. As a result, the performance of the conventional cells is limited to about less than 0.3 volt in output voltage and less than about 30 mA/cm$^2$ in output current. In addition, a number of safety issues arise with the use of acidic and alkaline solutions.

NASA's Jet Propulsion Laboratory (JPL) developed an improved direct liquid-feed cell using a solid-state membrane electrolyte. One of the advantages of the JPL fuel cell is the elimination of the liquid acidic and alkaline electrolyte by the membrane electrolyte. This solves many problems in the conventional fuel cells. A detailed description of JPL's fuel cell can be found, for example, in U.S. Pat. No. 5,599,638 and in U.S. patent application Ser. No. 08/569,452, filed on May 28, 1996, both of which are incorporated herein by reference.

FIG. 1 shows a typical structure 100 of a JPL fuel cell with a membrane electrolyte 110 enclosed in housing 102. The electrolyte membrane 110 is operable to conduct protons and exchange cations. An anode 120 is formed on a first surface of the membrane 110 with a first catalyst for electro-oxidation and a cathode 130 is formed on a second surface thereof opposing the first surface with a second catalyst for electro-reduction. An electrical load 140 is connected to the anode 120 and cathode 130 for electrical power output.

The membrane 110 divides the fuel cell 100 into a first section 122 on the side of the anode 120 and a second section 132 on the side of the cathode 130. A feeding port 124 in the first section 122 is connected to a fuel feed system 126. A gas outlet 127 is deployed in the first section 122 to release gas therein and a liquid outlet 128 leads to a fuel re-circulation system 129 to recycle the fuel back to the fuel feed system 126. In the second section 132 of the cell 100, an air or oxygen supply 136 (e.g., an air compressor) supplies oxygen to the cathode 130 through a gas feed port 134. Water and used air/oxygen are expelled from the cell through an output port 138.

In operation, a mixture of an organic fuel (e.g., methanol) and water is fed into the first section 122 of the cell 100 while oxygen gas is fed into the second section 132. Electrochemical reactions happen simultaneously at both the anode 120 and the cathode 130, thus generating electrical power. For example, when methanol is used as the fuel, the electro-oxidation of methanol at the anode 120 can be represented by

and the electro-reduction of oxygen at the cathode 130 can be represented by

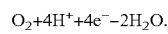

Thus, the protons generated at the anode 120 traverse the membrane 110 to the cathode 130 and are consumed by the reduction reaction therein while the electrons generated at anode 120 migrate to the cathode 130 through the electrical load 140. This generates an electrical current from the cathode 130 to the anode 120. The overall cell reaction is:

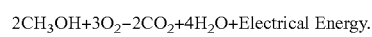

The inventors recognized the advantages and potential of the JPL's membrane fuel cell. Importantly, the inventors have discovered a number of new materials for various components and processing methods that can be used to improve the performance of this type of fuel cells.

One aspect of the present invention describes new material compositions for catalysts with improved efficiency and methods for forming catalyst layers on the membrane electrolyte including transfer of catalyst decals and deposition of catalyst materials onto a backing layer with minimized catalyst permeation.

Another aspect directs to improve catalyst efficiency and reactivity by increasing the surface area thereof.

Yet another aspect is to increase the reactivity of a catalyst by changing the electronic properties of a catalyst layer.

Still another aspect of the invention is construction and processing of the electrolyte membrane to improve coating, bonding, and to reduce fuel crossover.

BRIEF DESCRIPTION OF THE DRAWINGS

These and other advantages of the present invention will become more apparent in light of the following detailed description of preferred embodiment thereof, as illustrated in the accompanying drawings, in which:

FIG. 1 is a block diagram illustrating a typical direct liquid-feed fuel cell having a solid-state membrane electrolyte.

FIGS. 3A and 3B are schematics to illustrate a preferred process for transferring decals from a backing block to a membrane surface.

DESCRIPTION OF PREFERRED EMBODIMENTS

Certain aspects of the preferred embodiments are disclosed in the incorporated references, U.S. Pat. No. 5,599,638, and U.S. patent application Ser. No. 08/569,452. Therefore, the brevity in describing various parts of the present invention is supplemented by the disclosure of the above references.

1. Catalyst Decal: Decal Preparation and Transfer

Both the anode and cathode in the preferred fuel cell have catalyst materials for the electro-chemical reactions. The catalyst for the electro-oxidation of the fuel at the anode can use a number of materials including platinum/ruthenium alloy. The cathode catalyst for the electro-reduction of oxygen can use materials such as platinum. It is desirable to form a good mechanical and electrical contact between a catalyst material and the respective membrane surface in order to achieve a high operating efficiency. An electrically conducting porous backing layer is preferably used to collect the current from the catalyst layer and supply reactants to the membrane catalyst interface. A catalyst layer, therefore, can be formed on the backing layer. The backing layer can be made of various materials including a carbon fiber sheet.

The inventors recognized that improvements can be made in the well-known method of using transferable catalyst decals. Information about catalyst decals can be found, for example, U.S. Pat. No. 5,798,187 to M. Wilson et al. of Los Alamos National Lab, which is incorporated herein by reference.

A decal layer is a layer of catalyst on a substrate (e.g., TEFLON). The purpose of this decal is to transfer the catalyst layer onto a proton conducting membrane. This is described in detail as follows.

Figure 2A:
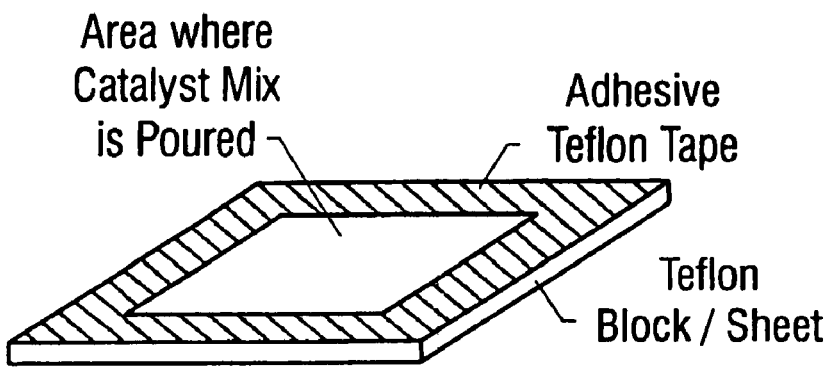
FIGS. 2A-2C are schematics to illustrate a processing example for forming a catalyst decal on a TEFLON backing block or sheet with a catalyst ink.
Figure 2B:
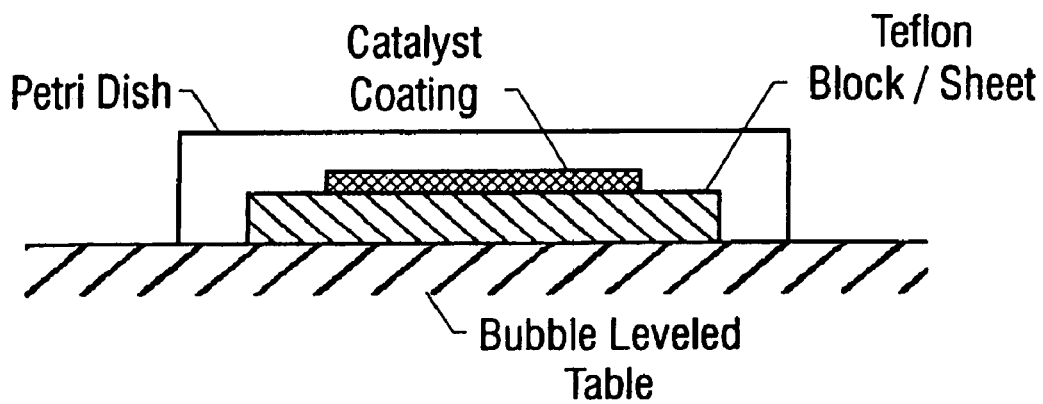
Figure 2C:
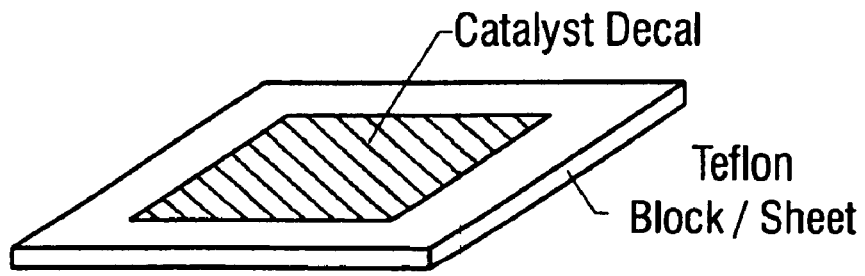

I. Preparation of Transferable Catalyst "Decals" for Application on NAFION and other Proton Exchange Membranes FIGS. 2A-2C illustrate a preferred process for forming catalyst decals. This is described as follows.

(1) A selected catalyst material, perfluorovinylether sulfonic acid (e.g., NAFION by DuPont) and polytetrafluoroethylene (e.g., TEFLON) in appropriate proportions are mixed. The mix includes approximately 150 mg of the catalyst, 0.7-1.4 g of 5% NAFION solution, and 0.2-0.4 g of a TEFLON emulsion such as TFE-30 (diluted to 11% in solids). The solvent can be a solution having NAFION in higher alcohols commercially available from Aldvich Chemical Co. Therefore, a preferred ratio of the constituents in the mix is: 7-10% catalyst, 60-70% NAFION solution (5% solution), 15-20% in TFE-30 that has been diluted to 11% in solids.

(2) A preferred mixing order is first mixing the catalyst and diluted TFE solution and performing a first sonication for an appropriate amount of time (e.g., approximately from 5 to 20 minutes) and then adding the NAFION solution and performing a second sonication (e.g., approximately from 5 to 20 minutes).

(3) A TEFLON sheet is prepared by degreasing the surface.

(4) The TEFLON substrate on which a catalyst layer will be cast is flattened out and laid on a substantially horizontal surface (e.g. a bubble-leveled table). The area of coating can be marked out using TEFLON adhesive tape.

(5) The mix of catalyst, NAFION, and TEFLON solution is poured into the blank area on the TEFLON substrate previously marked.

(6) The mix is then uniformly spread out in the coating area to form a catalyst layer therein. This can be done, for example, by using a glass rod with a rounded end in a rotational motion (e.g., executed over a hundred times).

(7) The catalyst layer on the TEFLON backing layer is allowed to dry out slowly so that evaporation occurs at a predetermined slow rate to eventually form a uniformly-dried coating layer. This can be done, for example, by enclosing the sample in a container such as petridish or glass cover for about 12-24 hours.

II. Decal Processing (1) After the decal is dry, it is sprayed with a layer of water on the decal. Alternatively, the decal can be sprayed with isopropanol or a mixture of isopropanol and water.

(2) The sprayed decal is submerged in water (e.g. in a sealed plastic bag containing water) for a soaking period ranging approximately from 1 to 24 hours. Other liquids can also be used for soaking. For example, soaking in pure isopropanol ("IPA") rather than water can reduce the soaking time. The inventors discovered that semi-dry coatings are not easy to work with and spraying on semi-dry coatings may result in loss of materials and disintegration of the catalyst coating. Therefore, a long drying period (e.g., 24 hours) for the catalyst layer under slow evaporation is preferred prior to decal processing.

(3) The decal is ready for transfer after the above soaking process.

III. Transferring Decal onto Membrane (1) The membrane is preferably conditioned by a three-step process of treatment: boiling at a temperature approximately from 90° C. to 100° C. in 5% $H_2O_2$ solution, then treating in $H_2SO_4$, and followed by boiling in water.

(2) Next, the membrane can be either soaked in water on in a mixture of isopropanol and water for a predetermined soaking time (e.g., 24 hours). A mixture of about 10% of isopropanol and 90% of water by volume is preferred to achieve a desired degree of swelling of the membrane for the decal transfer. The inventors discovered that this makes the membrane accept the decal better.

(3) The soaked membrane is then mopped dry and placed between two rigid and compressible sheets with the coated decal facing the membrane. The sheets are preferably made of corrosion-resistant materials such as gold-plated materials, carbon-coated materials, and titanium.

(4) Next, the sandwich of membrane and decal block is hot pressed with the metal sheets under a pressure of about 500-1500 psi and at a temperature of about 140-155° C. for about 3-5 minutes and further treated in the same way as the membrane-electrode assembly (MEA) (e.g., application of backing layer and soaking in water or a water solution). See, for example, U.S. patent application Ser. No. 08/569,452, filed on May 28, 1996, which is incorporated herein by reference.

(5) The pressed pieces are cooled down under pressure at a low temperature (e.g., <55° C.).

(6) The pressed parts can be removed. The TEFLON backing layer can be peeled off, leaving the catalyst layer fixed on the membrane.

The above decal transfer process is illustrated in FIGS. 3A and 3B.

The inventors investigated a number of parameters that affect the decal transfer process as described above. In particular, a Taguchi style experiment was conducted to optimize many processing parameters. A Taguchi experiment is a factorial design experiment wherein factors governing process performance are varied in a systematic manner for optimization. See, for example, "Quality Engineering Using Robust Design", by M. S. Phakhe, Prentice Hall, New Jersey, 1989. The inventors studied following parameters:

1. NAFION content;
2. TEFLON content;
3. Drying time;
4. Soak process (yes/no);
5. Temperature of pressing;
6. Pressure of "pressing"; and
7. Membrane soak process (IPA or water).

The catalyst was substituted with battery grade graphite in the experiment.

The above investigation indicated that increasing NAFION content and decreasing TEFLON content can be beneficial to the decal transfer. Performing the membrane soak process in IPA resulted in a good transfer, i.e., a large extent of the decal (e.g., over 85%) is transferred. The inventors also discovered that the coating soak process in water was important to attaining good transfer. Using pressure in an appropriate range was also found to be important in attaining good transfer. However, the drying time appeared to have no observable effect as long as the decal is completely dry.

The inventors found that the effects of various parameters can be summarized as follows: (1) increasing NAFION amount increased the extent of transfer; (2) increasing the TEFLON content decreased the amount of transfer; (3) drying time has no significant impact except that the coating has to be dry; (4) the soaking process improved the transfer; (5) increase of pressure favored decal transfer; and (6) membrane presoak in a solution having IPA and water significantly enhanced transfer.

The following are the values for all these parameters for the experiment that resulted in an optimized transfer:

Catalyst: 0.144 g over 2"×2"
NAFION: 1.430 g
TEFLON: 0.213 g
Temperature: 145° C.
Pressure: 500-1500 psi
Drying time: 24 hours (or less)
Decal soak process: IPA or water for 24 hours
Membrane soak: IPA/water (10-20/90-80) for 24 hours.

2. Methods for Improving Catalyst Utilization

Catalyst utilization refers to the extent to which the catalyst used in the preparation techniques is actually operative in the fuel cell reactions. The inventors discovered several approaches to improve the catalyst utilization.

I. Methods for Depositing Catalyst Material onto Carbon Backing Layer without Permeation Catalyst layers are applied in a conventional process by painting an ink on the carbon porous backing layer. This ink often soaks into the backing layer. This results in unusable catalyst that is locked in the pores of the backing layer. The inventors recognized that this permeation of the catalyst into the porous backing layer reduces accessability of the catalyst for reactions. The inventors further found that many techniques can be used to apply catalyst layers onto a back layer without permeation of the catalyst material. Several examples are give as follows.

(1) Instant drying of the catalyst layer as soon as the ink touches the paper. The ink is a mixture of catalyst, TEFLON, NAFION solution and water. The instant drying can be achieved by first heating the paper to a temperature at which the solvent used in the ink evaporates. The surface of the paper is subsequently sprayed with the catalyst ink to leave behind a good superficial coat of the catalyst without significant preparation of the catalyst layer into the porous backing layer.

The inventors found that the fast drying process could give a very different coat morphology which may have an impact. This, however, can be obviated by applying multiple coats as discovered by the inventors.

(2) Dual-Layer structure of carbon paper. A layer of porous carbon is applied on the carbon paper to create a less porous super structure. This substantially prohibits the catalyst from penetrating into the carbon paper. Graphite, a highly conducting material, can also be used in place of the porous carbon, specially sub-micron size graphite. Other conducting materials that are resistant to acids, such as gold, can be used according to the invention.

The porosity of this layer will be determined by the size of the carbon or graphite particles and the binder used therein. A good binder, e.g., NAFION, will allow the next coat of catalyst to have a good ionic and electronic contact. The carbon layer can be coated by any technique, including but not limited to, spray painting, screen printing, brushing or electro-painting.

The catalyst layer can be coated on the carbon paper by any coating technique. The carbon layer should not inhibit mass transfer of the methanol solution and the removal of carbon dioxide bubbles if it is hydrophilic and is also formed from porous carbon. The formation of the dual layer structure has been verified under the microscope by the inventors.

The inventors recognized that the instant drying technique described in (1) can be integrated with the above dual layer structure of the carbon paper.

(3) It is also possible to teflonize a sheet of carbon paper and coat it with a water suspension of the catalyst. When this is dry, then the whole electrode can be dipped in NAFION solution and subsequently dried. This also prevents the particles from migrating into the paper.

(4) A thin super coat of the metal can be used to substitute carbon in smoothing the surface and forming a relatively porous second layer. This will allow painting or spraying of the surface with the catalyst ink without letting the material soak into the carbon paper or any other backing structure. Such a deposition of metal to form the second layer on the gas diffusion structure can also be carried out electrochemically, such as by electroplating of the metal.

II. Improving Properties of Anode and Cathode Catalysts

The inventors recognized that increasing the surface area of the catalyst can enhance the reactivity of the catalyst towards the carrying out fuel oxidation (e.g., methanol) and increase the reaction rate. Several exemplary methods in accordance with the present invention are as follows.

(1) Temporary introduction of a substance insoluble in the catalyst and removable by subsequent leaching may be used to increase the surface area of the catalyst. Such a substance can be a surface active substance which will prevent particle agglomeration and can be volatilized at a higher temperature. Non-ionic surfactants may be preferable. Metals such as zinc, aluminum, or tin incorporated in the catalyst during preparation can also serve this function.

(2) Freeze drying the solution during catalyst preparation using dry ice and subsequently evaporating the solution can yield highly active catalysts, because agglomeration of particles and growth of particles will be prevented by a freeze-drying process.

(3) Using a high surface area carbon (activated type) in the preparation will work as a particle isolation method in agglomeration processes and also enhance the conductivity of the catalyst itself. Examples of such carbons are acetylene black, Shawanigan Black, vulcan-XC-72, Black Pearls 2000, and alike.

(4) Adding large amount of air, an inert gas or nitrogen will promote the formation of foam-type structures. This can be performed during catalyst particle formation in order to prepare a high surface area catalyst. Air or preferably an inert gas and nitrogen should be bubbled through the solution during the precipitation of the Platinum and ruthenium hydroxides. This can be achieved by adding a volatile surfactant to the precipitating solution or to the starting solution. This can provide the condition for production of foam-like structures.

(5) The Pechini process (citrate gel) for forming oxides can be used as a precursor for the formation of high surface area structures. Pechini process is disclosed in U.S. Patent No. 3,330,697, which is incorporated herein by reference.

(6) Formation of the catalyst in the presence of large amounts of conducting substances such as lead dioxide can be used for effective dispersion (i.e., even distribution of the catalyst material). Lead dioxide is an inert conductive material resistant to acids.

III. Changing Electronic Properties of Interfacing Surface for Activating Catalyst (1) Varying the ratio of Pt:Ru and varying the temperature of preparation can be used to alter the electronic properties of the catalyst for a desired effect. The Pt:Ru ratio can be varied from about 10% Pt to 90% Pt, corresponding to 90% Ru to 10% Ru.

(2) Titanium can be used to activate the catalyst. Titanium and ruthenium form a solid solution of oxides. Use of isoproxide of titanium prior to the precipitation in the above methods of preparation of the catalyst can be beneficial.

(3) Quenching the catalyst after reduction, i.e., rapid cooling the catalyst from a high temperature (e.g., about 300° C.) to a low temperature (e.g., liquid nitrogen temperature of 77K), would create stresses in the particles. This generates new activation forces. Segregation of phases and stresses in the catalyst is produced by quenching. Such a quenching process can be done in liquid nitrogen.

(4) Use of a chemical field caused by zeolites may be important in orienting the molecules at the surface. Zeolites are capable of interacting with metals, such as Pt and Ru, and changing the electronic properties of the metals. This modification of the chemical nature of the catalysts can be exploited to enhance the activity of the catalysts.

(5) Addition of silica or titanium dioxide during preparation would alter the local electronic fields.

(6) An additive material can be used to modify the nature of the surface in such a way that the harmful effects of the adsorption are not observed. Such an additive could clean off the poisoning species or increase the ease of removal of the poisoning species. Suitable additive materials include Ir, Rh, Os, and alike.

(7) Reducing the size of particles to a nanoscale environment for the decomposition of methanol is another way of enhancing activity of methanol oxidation catalysts.

(8) Concentrating the additives on the surface instead of the bulk can be achieved by "adatom" approaches (i.e., forming thin atom layers from solutions). This method can be used to provide the additive in a selected region. Suitable additives include metals such as Bi, Sn, Sb, Ir, Rh, Os, deposited from solutions in thin layers on the catalyst.

For example, electroless deposition of other metals on the existing catalyst can be used for surface modification with adatom. Another method is addition of metal salts to the catalyst wash bath, which may also provide adequate number of adatoms for this purpose.

(9) Changing the phase of the substance could include the formation of non-equilibrium phases. These phases are usually quite active compared to the equilibrium phase. High-energy ball milling might be an approach to produce such non-equilibrium phases. These can be used for Pt—Ru, Pt—Ru—X wherein X includes Ir, Rh, Os, or Ti.

IV. Modifications to Catalyst Layer with Respect to Altering Hydrophobic and Hydrophilic Constituents to Improve Performance (1) The inventors discovered that TEFLON added in the catalyst layer such as by using TFE-30 usually does not have any hydrophobic characteristics because it is with a surfactant. Also, the hydrophilic surfactant will compete for the catalyst active surface. Elimination of TEFLON emulsion from the catalyst mix will eliminate the surfactant. However, TEFLON itself is beneficial. The layer can then use TEFLON micron powder (e.g., MP1100). This will provide the TEFLON properties without adding the surfactant. The Inventors have used such an ink and have found it performs well. Therefore, this new method of incorporating TEFLON would be beneficial to the anode and the cathode.

Replacing with TEFLON powder (such as the MP series 1100 typically) or with PVDF can be beneficial. The use of large amounts of macro particular TEFLON will allow access of air to the various parts of the catalyst layer more efficiently than small microscopic particles. Thus the TFE-30 addition can be replaced by using MP1100 or PVDF or Kynar material in the mix for the catalyst layer.

(2) The role of TEFLON in the catalyst layer could be significant in reducing the open area for methanol transport. In order to attain these properties, an alternative ink is to be made out of the crosslinked polystyrene sulfonic acid and PVDF or Kynar or a methanol rejecting zeolite such as mordenite. These layers can be applied in one or more layers with or without the catalysts. These additives can be applied in one or more layers. The inventors contemplate that the primary catalyst may be used with mere polyvinylidene fluoride (e.g., PVDF) for the first layer, whereas a combination with the zeolite/crosslinked sulfonic acid PVDF can be used for the second layer. PVDF can be obtained in very fine powders and can be dissolved in some organic solvents and dispersed easily with the catalyst ink.

3. Other Catalysts and Preparation Methods

I. Laser Ablation

A new method for applying the catalyst on the gas diffusion substrate is laser co-ablation of Pt and Ru. This process involves the continuous or pulsed laser evaporation of a target followed by deposition on a substrate.

II. Ion Implantation

Yet another method for preparation of catalyst is ion-implantation. This can be carried out on existing catalysts or already prepared electrodes where ions of various materials such as Bi, Pb, Sn, P can be implanted to enhance the activity of the catalyst.

III. Tungsten Carbide

Tungsten carbide behaves like platinum under many circumstances of organic transformation and may be used as a catalytic material. Tungsten carbide combined with platinum is a good catalyst for Hydrogen evolution. Therefore, the inventors contemplate that tungsten carbide be combined with ruthenium oxide or ruthenium to prepare a new catalyst. Small amounts of platinum can also be added to the tungsten carbide material so that the activity of both tungsten carbide and platinum are enhanced. This can be incorporated into the present procedure to lower the costs of the catalysts.

High surface area tungsten carbide can be produced by the following method: (1) tungsten oxide can be deposited on a high surface area carbon sheet by a solution process which involves precipitation and drying; (2) then the tungsten oxide dispersed on carbon can be reduced with hydrogen at 500° C. or higher in order to substantially eliminate the oxygen. This will leave the active tungsten on the surface; (3) the temperature is then raised to about 900° C. will provide the carbide. By choosing the correct carbon to tungsten ratio, stoichiometric carbide with no excess carbon can be produced.

IV. Zirconium Dioxide

Zirconium dioxide is another material for catalysts of hydrogen and water based reactions. Combining Pt with zirconium oxide would yield a good catalyst. This can be prepared by an impregnation technique. The zirconium oxide is produced by a hydrolysis process from zirconium chloride or zirconyl nitrate solution. The platinum salt such as the chloride or nitrate is added to it in desired quantities and sonicated until complete dissolution of the platinum salt occurs and the platinum is uniformly distributed. A reducing agent such as formaldehyde and sodium formate is then added and the solution thereof is heated. Pt will deposit on the zirconium oxide. Several methods can be used to prepare $ZrO_2$-based catalysts. Two preferred examples are as follows.

Method 1: The objective is to prepare a fine dispersed Pt—$RuO_2$—$ZrO_2$ catalyst. Fine particle $ZrO_2$ can be produced by hydrolysis of zirconyl nitrate with a pH value at about 5-6. This can occur during the neutralization of the regular catalyst preparation method. The zirconium hydroxide formed will be the nucleus for precipitation of the $Ru(OH)_3$ and $Pt(OH)_3$. This ensures a fine grainy precipitate evaporate as usual. The resultant dry powder can be recovered by vacuum drying. This is followed by hydrogen reduction for about 16 hours. The catalyst Pt—$RuO_2$ is then washed and recovered. The catalyst mixture can include about 30-50% of $ZrO_2$ as a support agent.

Method 2: This method avoids the effect of chlorides and other amions completely.

$ZrO_2$ in a hydrous state is prepared by neutralization of $ZrO(NO_3)xH_2O$ solutions Pt (Acetyl acetonate) and Ru (Ac Hc) are added to $ZrO_2$ and allowed to absorb by an impregnation process. This solution is evaporated to dry out in vacuum. The solid is then reduced in hydrogen at 200-400° C. to produce bimetallic Zirconia supported Pt—$RuO_2$ catalysts. The catalysts should be washed to remove any absorbed ions.

The inventors have found that a catalyst can be formed with or without ruthenium oxide by using the present process for making Pt—Ru catalysts.

V. Zeolite-Based Catalysts

Pt and Ru can be incorporated in zeolites and clays in order to exploits the acid catalytic properties of these materials.

Pt cation complexes (e.g., ammine chlorides) and similar ruthenium complexes can be exchanged with zeolite material (ZSM, mordenites, etc.) and they can be treated with hydrogen at elevated temperatures (200-300° C.) to produce activated Pt—Ru catalysts with enormous surface area. These will reduce cost of catalysts for oxidation of methanol in fuel cells, and also provide carbon monoxide tolerant materials for hydrogen oxidation in fuel cells.

A preferred procedure for preparation of Zeolite based Pt—Ru or Pt—Ru—Ir catalysts is as follows.

(1) Zeolites such as the ZSM and natural zeolites are all in the sodium or potassium form. These need to be converted to the ammonium form by a standard linde procedure which involves boiling the zeolite repeatedly with ammonium chloride solutions and subsequent washing.

(2) These Ammonium exchanged Zeolites are then exchanged with $Pt^{(IV)}$ and $Ru^{(III)}$ or $Pt^{(II)}$ and $Ru^{(II)}$ by stirring with heat, zeolite plus the cationic complex of the appropriate metals. For example, $Pt(NH_3)_2^{4+}Cl_4$ or $Pt(NH_3)_2Cl_2$ or $H_2Pt(NO_3)_6$ or the nitrite sulfate salt of Pt. These materials form a Pt exchanged zeolite. Similar complexes such as $Ru(NH_3)_4Cl_3$ can be used to form the Ru-zeolite.

The inventors recognized that the following is preferably observed in preparing Pt—$RuO_2$ Zeolite catalysts.

(A) The Zeolite to be used should have fairly large pore diameters to accommodate metals such as Pt, Ru, Ir etc. Mol siv 13× is a zeolite with pores of about 10° and would be suitable for this process/purpose.

(B) At first the zeolite is exchanged with $NH_4^+$ by the standard Linde Process—($NH_4Cl$ reflux for 2-4 hours, repeated 2-3 times). Then the exchange with $Pt^{II}$ and $Ru^{III}$ is carried out from tetrammine cationic complexes of Pt and Ru. Other cationic complexes of the metal are also acceptable. $Pt^{IV}$ and $Ru^{IV}$ cationic complexes can also be used. This exchange can be carried out at 100° C. for efficient exchange. The metal loading in the zeolite can be controlled by choosing appropriate amounts of the metal in solution.

(C) The exchanged zeolite is now calcined at 550° C. by using flowing air. This results in the zeolite in the proton form.

(D) Next, reduction of the Pt and Ru in the zeolite is carried out in $H_2$/Ar mixture (e.g., 3-10% $H_2$) at a temperature of about 100-400° C. This method will result in a zeolite catalyst with high catalytic activity.

(E) After reduction, these catalysts can be thoroughly washed in water to remove chlorides and then be vacuum dried.

Similar complexes of iridium, osmium or tungsten can be used to form the appropriate catalyst. These catalysts are usually more active than conventionally dispersed catalysts.

(3) In order to improve conductivity when used as an electrode, the zeolites should preferably be mixed with a conducting form of carbon, such as graphite, Acetylene black, Shawanigan black, or Vulcan XC-72, to produce more conducting forms. Such an electrode is preferably formed by addition of a binder such as TEFLON/PVDF or EPDM.

Figure 4:
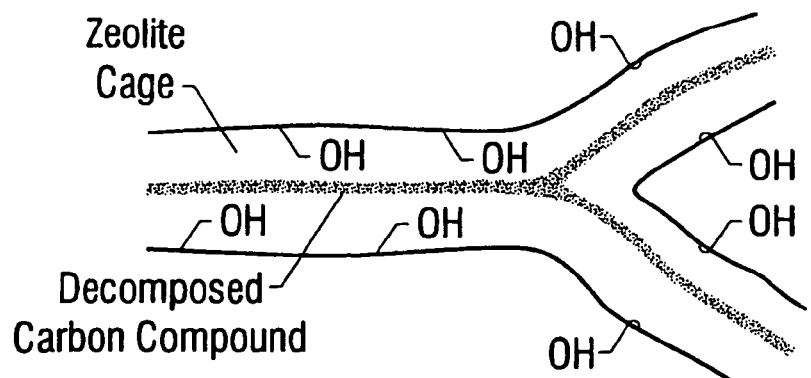
FIG. 4 is a schematic showing a zeolite cage having decomposed carbon compound as conducting elements.

Alternatively, it may be possible to introduce conducting back bones in zeolites cages using high concentration of metals in a selected zeolite with high exchange capacity. Also, carbon compounds of the type that degrade to elemental carbon can also be caused to decompose in the cage of the zeolite to form electrically conducting structures as shown in FIG. 4.

After such treatment, the zeolite can be exchanged to give the Pt, Ru or Pt, Pt—Ru—Iv(Os) catalysts.

VI. A Method of Alloying Pt—$RuO_2$ Catalysts

Figure 5A:
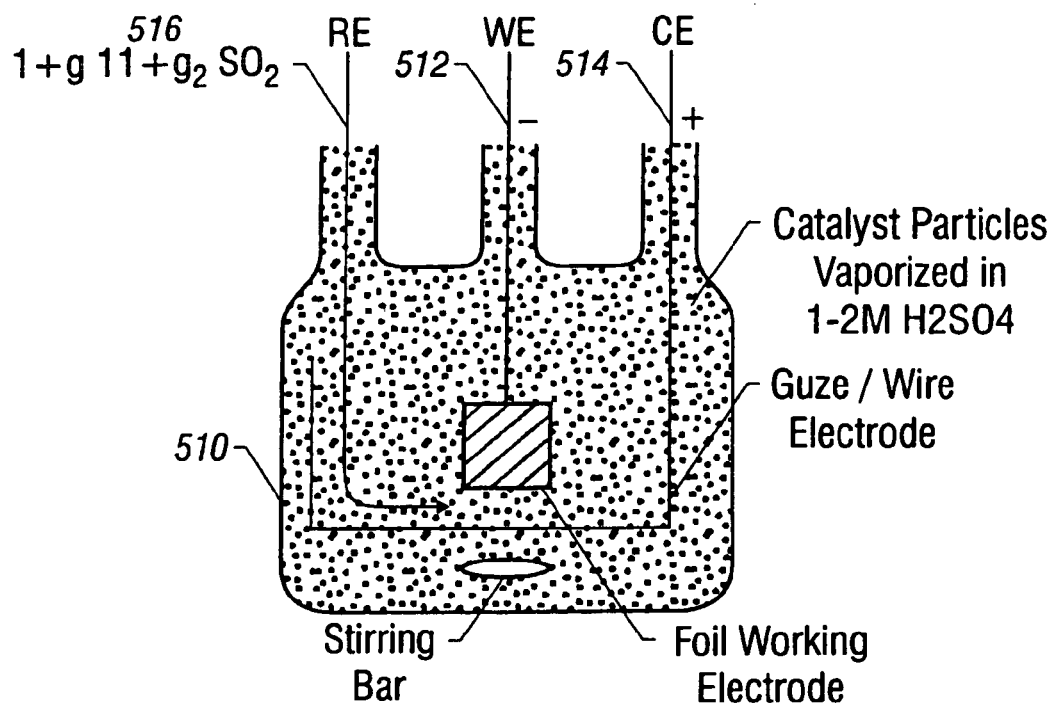
FIGS. 5A and 5B are schematics showing two preferred systems for alloying Pt—$RuO_2$ catalysts.

An alloy of Pt—Ru may be used in place Pt—$RuO_2$, with some advantages. The method of alloying the Pt—$RuO_2$ catalysts to be described is electrochemical. The basis of this method is that electrochemical hydrogen evolution and electrochemical oxide reductions are more effective ways of reducing $RuO_2$ to Ru. The set up is illustrated in FIG. 5A. A single compartment having catalyst-suspended solution is used. The potential of the working electrode has a negative potential while the counter electrode (CE) has a positive potential.

Figure 5B:
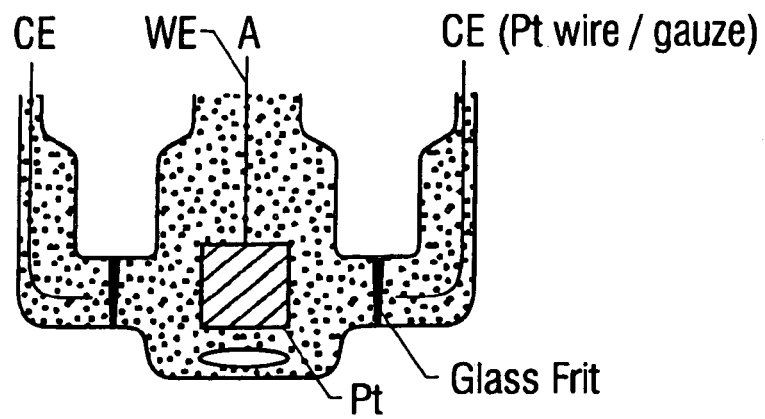

Preferably, separated cathode and anode compartments should be used as shown in FIG. 5B. The catalyst particles are confined in the center compartment with the working electrode (WE). In one configuration, WE is held at −0.1 Volt with respect to the potential at the normal hydrogen electrode ("NHE").

When the particles strike the cathode, electrochemical reduction will occur. The current and charge can be used to control the extent of reduction. Such a process is likely to produce an alloyed Pt—Ru which is more active than that produced by merely $H_2$/Ar reduction.

VII. Fine Particle Amorphous/Intermetallic Alloys by Hydrolysis of Transition Metal-Mixed Grignard Reagents A method of preparation of amorphous intermetallic alloys can be used to prepare catalysts for methanol and methane oxidation. Aleandri et al. disclose one preparation method in Chem. Mater., vol. 7, pp. 1153-1170 (1995), which is incorporated herein by reference. A preferred preparation procedure is described below.

The transition metal grignard reagents prepared by heating $MCl_x$ (wherein M stands for transition metal elements including Ni, Fe, Pd, Pt, Ru, Rh, Ir) with excess amounts of Aactive magnesium@ or $Et_2Mg$ in THF generating soluble bimetallic species with generalized formula $M^1(MgCl)_m(MgCl_2)_p$, wherein m=1, 2, 3 and p=0~1. These inorganic grignard reagents react further with $M^2Cl_x$ in a mole ratio n:m, thus giving intermetallics as follows:

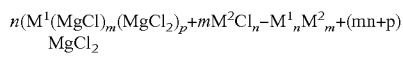

$$n(M^1(MgCl)_m(MgCl_2)_p + mM^2Cl_n \rightarrow M^1{}_nM^2{}_m + (mn+p)MgCl_2$$

These $M^1{}_nM^2{}_m$ alloys are amorphous nano-scale crystalline. This method produces very fine particles which will serve as active catalysts.

4. Improvement in Bonding between Membrane and Coatings

The use of isopropanol in the previous experiment demonstrates that swelling the membrane facilitates chain entanglement.

The process of chain entanglement is important in improving adhesion between two layers of polymers, such as in lamination or in the bonding of dissimilar membranes which do not bond easily. Thus swelling the membrane can be applied, for example, to bond membranes which are not sufficiently thermoplastic to cause intermingling of polymer chains. The inventors found that solvent molecules can be used to decrease inter-chain interaction. This allows the possibility of intermingling of chains between both layers.

The inventors developed a method to improve the bonding between coated electrodes and the membrane. After the carbon-paper based electrodes are prepared and allowed to dry, they may be sprayed with a mixture of isopropanol, t-butanol or water-based mixture of these alcohols, having at least 50% by volume of the alcohols to swell the dry catalyst layer. This can be done just before the electrodes are laid on the membrane for pressing. Alternately, swelling of the dry catalyst layer can also be achieved by spraying the membrane or soaking the membrane in alcohols (IPA/t-butanol) or alcohol water mixtures.

The inventors observed that the temperature resistance of isopropanol soaked membranes appears to be lower than hydrated membranes. This manifests itself as browning of the membranes as the pressing of the MEAs at 145-150° C. Unhydrated membranes have been found to behave similarly.

Therefore, it may be preferable to treat the coating with IPA/butanol, rather than the membrane. It is not clear whether the ionomer also suffers a change as a result of the low hydration level. In this case, hydrating the membrane in water may be a better treatment.

5. Water Removal from Air Electrode (1) Water draining structures on the carbon paper can be incorporated on the outside of the gas diffusion backing. This can either be painted on imprinted by screen painting process. Even a pressed on structure will be acceptable. The possible materials which can form these hydrophilic patterns are NAFION, Platinum, platinized titanium, titanium nitride or gold. NAFION for example can be painted on to the surface to form lines and patterns. Metal screens can be pressed on to the surface.

(2) The whole outer surface of the gas diffusion backing could be made hydrophilic by spraying a thin layer of NAFION on a hot substrate, or giving a thin coat of t substrate, or giving a thin coat by sputter deposition process or electrodeposition process.

(3) These hydrophilic structures (in 1 and 2 above) can then be integrated with wicking structures. One way of testing out the efficiency of the wicking process is to see how much water comes off the cathode of a dummy cell when air is blown at a low flow rate across it. If the amount of water removed would have to be different for various structures in order for them to make an impact on efficient water removal.

5. Methods for Reducing Fuel Crossover

Ideally, all fuel should undergo the electro-oxidation at the anode and be used to generate electrical energy. However, a portion of the fuel which is dissolved in water permeates through the solid polymer electrolyte membrane and directly combines with oxygen. This portion of fuel does not generate any electrical energy and is essentially wasted. This is called "fuel crossover". Fuel crossover is undesirable since it reduces the operating potential of the oxygen electrode and results in consumption of fuel without producing useful electrical energy. Further, fuel crossover generates undesirable heat in the fuel cell.

The inventors discovered that the permeability of the membrane can be changed by processing the surface with zeolites. The zeolite structure with the appropriate pore size can be used to reduce the crossover of the fuel (e.g., methanol). Typically, zeolites such as Mol-siv 3A, 4A, 5A from Union Carbide in the protonic form would be candidate materials. These protonic forms can be produced by standard methods of Ammonium ion exchange followed by calcining at about 550° C. in air. Such a calcined zeolite can be used in a number of ways, including:

a) mixed with the catalyst to fill the voids between the catalyst particles;

b) applied along with NAFION as a second layer on the electrode; and c) combined with conductive carbon, such as Shawanigan black or graphite, and mixed in with NAFION ionomer to form a layer adjacent to the membrane electrolyte.

The Zeolite containing layer may be formed to increase the concentration/content of zeolite in the subsequent layers. In this way, the catalyst utilization can be maintained without restricting the access to methanol to the catalyst. When the methanol attempts to enter the membrane, the zeolite particles will suppress such a transport.

Zeolite as a "crossover inhibitor" is preferable to inert materials such as TEFLON because Zeolites in the protonic form offer some ionic conductivity.

This approach can be integrated with zeolite supported metal catalysts. A mixture of zeolite catalyst and zeolite crossover inhibitor may be applied. A zeolite, which excludes methanol, may not be a good choice for catalyst preparation as it prevents access of the methanol to the catalyst. This reduces the efficacy of oxidation processes.

Although the present invention has been described in detail with reference to a few preferred embodiments, one ordinarily skilled in the art to which this invention pertains will appreciate that various modifications and enhancements may be made without departing from the scope and spirit of the present invention, which are further defined by the following claims.

What is claimed is:

1. A catalyst material for a fuel cell, comprising: a catalyst comprising zeolites incorporated with platinum and ruthenium; and
a polytetrafluoroethylene.

2. A catalyst material for a fuel cell, comprising:
a catalyst comprising zeolites incorporated with platinum and ruthenium and a polytetrafluoroethylene; and wherein said catalyst further includes tungsten in said zeolites.

3. A catalyst material for a fuel cell, comprising: a catalyst comprising zeolites incorporated with platinum and ruthenium;
a perfluorovinylether sulfonic acid; and
a polytetrafluoroethylene; and and electrically-conductive carbon material.

* * * * *